I. W. DAVIS.
NUT LOCK.
APPLICATION FILED OCT. 12, 1916.
1,276,882.
Patented Aug. 27, 1918.
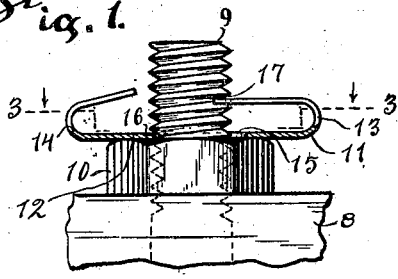
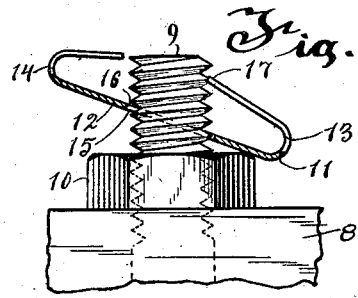
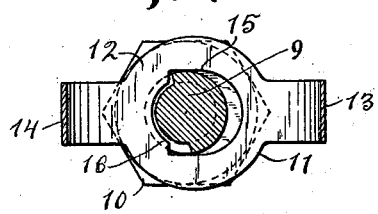
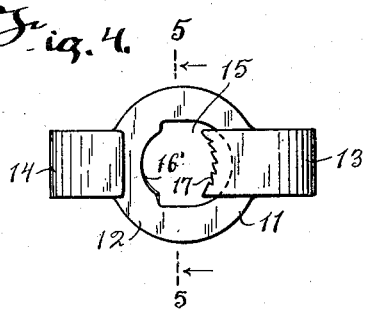
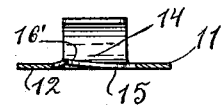
INVENTOR
Irvin W. Davis
By Morsell, Keeney & French
ATTORNEYS

UNITED STATES PATENT OFFICE.

IRVIN W. DAVIS, OF MILWAUKEE, WISCONSIN.

NUT-LOCK.

1,276,882.

Specification of Letters Patent.

Patented Aug. 27, 1918.

Application filed October 12, 1916. Serial No. 125,160.

*To all whom it may concern:*

Be it known that I, IRVIN W. DAVIS, a citizen of the United States, and resident of Milwaukee, in the county of Milwaukee and State of Wisconsin, have invented new and useful Improvements in Nut-Locks, of which the following is a description, reference being had to the accompanying drawings, which are a part of this specification.

This invention relates to improvements in nut locks.

It is one of the objects of the present invention to provide a nut lock more particularly, although not solely, adapted for light work and which may be used as a locking means for an ordinary nut or which may be used alone as a spring nut having self locking features.

A further object of the invention is to provide a nut lock which is adapted to be used for either a right or left hand threaded bolt.

A further object of the invention is to provide a nut lock having a projecting portion forming a handle for convenience in threading the nut on a threaded member.

A further object of the invention is to provide a nut lock which may be quickly placed upon the bolt without the necessity of turning the nut lock the entire length of the thread.

A further object of the invention is to provide a nut lock having a locking portion which engages the thread of the bolt in a wedging manner to firmly maintain the part in position.

A further object of the invention is to provide a nut lock which is well adapted for use in attaching a wire to the terminal pole of a battery cell of the dry or other type.

A further object of the invention is to provide a nut lock which is of simple and strong construction, is efficient in use and may be manufactured at a minimum cost.

With the above and other objects in view the invention consists of the improved nut lock and its parts and combinations as set forth in the claims, and all equivalents thereof.

In the accompanying drawing in which the same reference characters indicate the same parts in all of the views:

Figure 1 is a side view, partly in section, of the improved nut lock shown mounted upon a threaded member and in locking engagement with an ordinary nut and in wedging engagement with the threaded member;

Fig. 2 is a similar view with the nut lock shown in an unlocked position;

Fig. 3 is a transverse sectional view thereof taken on line 3—3 of Fig. 1;

Fig. 4 is a top view of a slightly modified form of nut lock; and

Fig. 5 is a transverse sectional view taken on line 5—5 of Fig. 4.

Referring to the drawing the numeral 8 indicates a framework or other support from which a bolt or threaded bar 9 projects. An ordinary nut 10 is threaded on the bar and the improved nut lock 11 is shown as threaded on the bolt and in locking engagement with the nut 10. The nut lock 11 is formed of a strip of spring metal having a medial circular portion 12 of a diameter approximately the same as the diameter of the ordinary nut of the bolt it is to engage and while shown as of circular shape it may be of any other form desired. The end portion or finger 13 is of slightly greater length than the end portion or finger 14 and both tongues are bent over upon the medial portion and extend toward each other at an upward inclination. The finger or handle 14 is provided for convenience in threading the nut lock on a bolt and to provide a more symmetrically shaped device, but may be omitted if desired. The medial portion 12 is formed with an aperture 15 punched therethrough which is of slightly elongated form with the elongation extending lengthwise of the strip to permit the lock nut being tilted at an angle and placed on the bolt without turning the said nut. A portion 16 of the material forming the edge of the aperture opposite to the longer bent over end portion 13 is of approximately semicircular form and of a diameter slightly larger than the diameter of the thread it is to engage, and said portion projects inwardly a slight distance from the other portion and forms a partial thread.

The inner edge of the inwardly and upwardly turned end or finger 13 is curved and formed with teeth 17 shaped to bite into the metal of the thread groove of the bolt it engages when turned in a direction to unthread the nut lock and said finger overlaps a portion of the aperture. In a plane parallel to the medial portion 12 the distance between the thread portion 16 and the toothed edge 17 of the finger 13 is less than the diameter of the bottom portion of the thread of the bolt it is adapted to engage so that when engaged the finger 13 will exert inward and upward clamping effect on the bolt thread and this clamping effect will be increased as the finger is sprung inwardly to a plane parallel with the medial portion.

In placing the nut lock upon a bolt the elongated aperture permits the said lock to be tilted and slid on the bolt as shown in Fig. 2 until the medial portion of the member, from which the finger 13 projects, rests on the nut 10 or other surface. The nut lock is now turned on the thread of the bolt and in turning the thread portion 16 and the locking finger 17 which engage the opposite sides of the bolt thread will work the lock to a position parallel with the face of the nut and into wedging or clamping relation with the bolt, said wedging relation being produced by the movement of the locking finger from an angular position with relation to the medial portion of the nut lock to a position approximately parallel thereto. This position of the parts will firmly draw the thread portion 16 into firm engagement with the bolt thread and cause the teeth of the finger to bite into the metal of the bolt and lock said lock nut and the ordinary nut firmly in position.

While the locking finger is preferably provided with teeth the teeth may be omitted if desired and while shown as angled for a right handed thread the angle may be reversed for a left handed thread.

In the form shown in Figs. 4 and 5 the thread portion 16 is shown as inclined to correspond to the pitch of the bolt thread and may be used to advantage in connection with some threads.

From the foregoing description it will be seen that the nut lock will clampingly engage the bolt and press downwardly on and maintain the ordinary nut in position. When the nut lock is used for electrical connections or other light work it may be used alone as a spring nut and will firmly hold itself in position.

What I claim as my invention is:

1. A nut lock, comprising a strip of material having a bolt opening formed therein of a size to permit the free passage of the threaded portion of a bolt therethrough without engagement with the thread, said strip of material having a folded over finger portion the free end portion of which forms a partial thread and overlaps a part of the bolt opening and prevents the free passage of the threaded portion of the bolt except when the strip of material is tilted obliquely with relation to the axis of the bolt, the edge portion of the material forming the bolt opening and opposite to the finger and the free end of the finger forming partial threads for clampingly engaging the bolt thread when the strip of material is positioned substantially at right angles to the bolt axis.

2. A nut lock, comprising a strip of material having an opening therein for receiving a bolt but larger than the outer thread diameter of the bolt to permit its free passage thereover, a part adjacent said opening forming a partial thread engaging the thread portion of the bolt, and a folded over finger portion projecting inwardly and having its free end forming a partial thread for engagement with the bolt diametrically opposite but spaced above the portion engaged by the first mentioned partial thread to permit said strip of material to be tilted obliquely and slipped onto the bolt in tilted position until that part of the strip adjacent said finger engages the member to be locked whereupon subsequent turning of the strip will bring its upwardly tilted portion into engagement with the member to be held and in a position at substantially right angles to the bolt axis and move the free end of the finger portion downwardly clampingly against the threaded portion of the bolt.

In testimony whereof, I affix my signature.

IRVIN W. DAVIS.